United States Patent
Wang et al.

(10) Patent No.: US 11,941,869 B2
(45) Date of Patent: Mar. 26, 2024

(54) METHOD, DEVICE, AND COMPUTER PROGRAM PRODUCT FOR DATA AUGMENTATION

(71) Applicant: Dell Products L.P., Round Rock, TX (US)

(72) Inventors: Zijia Wang, WeiFang (CN); Wenbin Yang, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 215 days.

(21) Appl. No.: 17/676,426

(22) Filed: Feb. 21, 2022

(65) Prior Publication Data

US 2023/0237780 A1   Jul. 27, 2023

(30) Foreign Application Priority Data

Jan. 21, 2022  (CN) .......................... 202210072009.8

(51) Int. Cl.
*G06N 3/126* (2023.01)
*G06V 10/74* (2022.01)
*G06V 10/774* (2022.01)

(52) U.S. Cl.
CPC ......... *G06V 10/7747* (2022.01); *G06N 3/126* (2013.01); *G06V 10/761* (2022.01)

(58) Field of Classification Search
CPC .............. G06V 10/7747; G06V 10/761; G06V 10/462; G06V 10/774; G06V 10/771; G06N 3/126
See application file for complete search history.

(56) References Cited

PUBLICATIONS

Nguyen et al, Satic saliency vs. Dynamic saliency: A comparative study, 2013, MM Conference, pp. 986-996. (Year: 2013).*
Fujita et al, Data Augmentation using Evolutionary Image Processing, 2018 Digital Image Computing Techniques and Applications, pp. 1-7. (Year: 2018).*
He et al, Momentum Contrast for Unsupervised Visual Representation Learning, 2020, arXiv: 1911.05722v3, pp. 1-12. (Year: 2020).*
Lin et al, Computational Model for Saliency Maps by Using Local Entropy, 2010, Twenty-Fourth AAAI Conference on Artificial Intelligence, pp. 1-7. (Year: 2010).*

(Continued)

*Primary Examiner* — John Villecco
*Assistant Examiner* — Kathleen M Broughton
(74) *Attorney, Agent, or Firm* — Ryan, Mason & Lewis, LLP (57) ABSTRACT

Embodiments of the present disclosure relate to a method, an electronic device, and a computer program product for data augmentation. The method includes: generating a group of candidate images based on a target image by using a thermodynamic genetic algorithm (TDGA) model, the TDGA model being configured to apply one or more operations of a set of predetermined image processing operations during each evolution process; and determining multiple augmented images from the group of candidate images based on free energy of the group of candidate images, the multiple augmented images being determined as belonging to the same classification with the target image. In this way, data augmentation can be efficiently implemented by a thermodynamic genetic algorithm.

18 Claims, 3 Drawing Sheets

(56) References Cited

PUBLICATIONS

Selvaraju et al, CASTing Your Model: Learning to Localize Improves Self-Supervised Representations, 2020, arXiv: 2012:04630v1, pp. 1-16. (Year: 2020).*

Wang et al, Contrastive Learning with Stronger Augmentations, 2021, IEEE Transcactions on Pattern Analysis and Machine Intelligence, arXiv:2014.07713v1, pp. 1-10. (Year: 2021).*

Terauchi et al, Evolutionary Approach for AutoAugment Using the Thermodynamical Genetic Algorithm, 2021, AAAI Technical Track on Machine Learning, 35(11) pp. 1-9. (Year: 2021).*

Lemley et al, Smart Augmentation Learning an Optimal Data Augmentation Strategy, 2017, arXiv:1703.08383v1, pp. 1-12. (Year: 2017).*

Huang et al, A hybrid genetic algorithm for feature selection wrapper based on mutual information, 2007, Pattern Recognition Letters 28 (2007) 1825-1844. (Year: 2007).*

Varpa et al, Genetic Algorithm Based Approach in Attribute Weighting for a Medical Dataset, 2014, J. Comp. Med., 2014 (526801) pp. 1-11. (Year: 2014).*

Demiroz et al, Genetic Algorithms to Learn Feature Weights for the Nearest Neighbor Algorithm, 1996, BU-CEIS-9612, pp. 1-11. (Year: 1996).*

A. M. Treisman et al., "A Feature-Integration Theroy of Attention," Cognitive Psychology, vol. 12, Jan. 1980, pp. 97-136.

L. Itti et al., "Feature Combination Strategies for Saliency-based Visual Attention Systems," Journal of Electronic Imaging, vol. 10, No. 1, Jan. 2001, pp. 161-169.

T. Kadir et al., "Saliency, Scale and Image Description," International Journal of Computer Vision, vol. 45, No. 2, Nov. 2001, pp. 83-105.

S. Chopra et al., "Learning a Similarity Metric Discriminatively, with Application to Face Verification," IEEE Computer Society Conference on Computer Vision and Pattern Recognition, Jun. 20-25, 2005, 8 pages.

M. Shahrokh Esfahani et al., "Effect of Separate Sampling on Classification Accuracy," Bioinformatics, vol. 30, No. 2, Nov. 20, 2013, pp. 242-250.

Y. Yamada et al., "ShakeDrop Regularization for Deep Residual Learning," arXiv:1802.02375v3, Jan. 6, 2020, 11 pages.

L. Itti et al., "Computational Modelling of Visual Attention," Nature, vol. 2, Mar. 2001, pp. 194-203.

N. Mori et al., "A Thermodynamical Selection Rule for the Genetic Algorithm," Proceedings of the 1995 IEEE International Conference on Evolutionary Computation, Nov. 29-Dec. 1, 1995, pp. 188-192.

S.-J. Park et al., "Saliency Map Model with Adaptive Masking Based on Independent Component Analysis," Neurocomputing, vol. 49, Dec. 2002, pp. 417-422.

L. Itti et al., "A Model of Saliency-Based Visual Attention for Rapid Scene Analysis," IEEE Transactions on Pattern Analysis and Machine Intelligence, vol. 20, No. 11, Nov. 1998, pp. 1254-1259.

J.-W. Woo et al., "Dynamic Obstacle Identification Based on Global and Local Features for a Driver Assistance System," Neural Computing & Applications, vol. 20, Oct. 2011, pp. 925-933.

* cited by examiner

METHOD, DEVICE, AND COMPUTER PROGRAM PRODUCT FOR DATA AUGMENTATION

RELATED APPLICATION(S)

The present application claims priority to Chinese Patent Application No. 202210072009.8, filed Jan. 21, 2022, and entitled "Method, Device, and Computer Program Product for Data Augmentation," which is incorporated by reference herein in its entirety.

FIELD

Embodiments of the present disclosure relate to the field of computers, and in particular to a method, a device, and a computer program product for data augmentation.

BACKGROUND

With the development of computer technologies, machine learning technology has been gradually applied to various aspects of people's lives. Computing devices may perform a wide variety of tasks using machine learning models.

Performance of the machine learning models is closely related to the size and quality of training data sets. In some fields, it is often difficult to obtain a sufficient amount of training data. Therefore, how to effectively perform data augmentation has become a focus of attention.

SUMMARY

Embodiments of the present disclosure provide a solution for data augmentation.

According to a first aspect of the present disclosure, a method for task processing is provided. The method includes: generating a group of candidate images based on a target image by using a thermodynamic genetic algorithm (TDGA) model, the TDGA model being configured to apply one or more operations of a set of predetermined image processing operations during each evolution process; and determining multiple augmented images from the group of candidate images based on free energy of the group of candidate images, the multiple augmented images being determined as belonging to the same classification with the target image.

According to a second aspect of the present disclosure, an electronic device is provided. The device includes: at least one processing unit; at least one memory coupled to the at least one processing unit and storing instructions for execution by the at least one processing unit, wherein the instructions, when executed by the at least one processing unit, cause the device to perform actions including: generating a group of candidate images based on a target image by using a TDGA model, the TDGA model being configured to apply one or more operations of a set of predetermined image processing operations during each evolution process; and determining multiple augmented images from the group of candidate images based on free energy of the group of candidate images, the multiple augmented images being determined as belonging to the same classification with the target image.

In a third aspect of the present disclosure, a computer program product is provided. The computer program product is stored in a non-transitory computer storage medium and includes machine-executable instructions that, when run in a device, cause the device to perform any step of the method described according to the first aspect of the present disclosure.

This Summary is provided to introduce the selection of concepts in a simplified form, which will be further described in the Detailed Description below. The Summary is neither intended to identify key features or essential features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

DETAILED DESCRIPTION

Example embodiments of the present disclosure will be described in more detail below with reference to the accompanying drawings. Although example embodiments of the present disclosure are illustrated in the accompanying drawings, it should be understood that the present disclosure may be implemented in various forms and should not be limited by the embodiments illustrated herein. Rather, these embodiments are provided to make the present disclosure more thorough and complete and to fully convey the scope of the present disclosure to those skilled in the art.

The term "include" used herein and variants thereof indicate open-ended inclusion, that is, "including but not limited to." Unless otherwise stated, the term "or" means "and/or." The term "based on" denotes "at least partially based on." The terms "an example embodiment" and "an embodiment" denote "at least one example embodiment." The term "another embodiment" means "at least one further embodiment." The terms "first," "second," and the like may refer to different or the same objects. Other explicit and implicit definitions may also be included below.

As mentioned above, the performance of machine learning models is closely related to the size and quality of training data sets. In some fields, it is often difficult to obtain a sufficient amount of training data. Therefore, how to effectively perform data augmentation has become a focus of attention.

A solution for data augmentation is provided according to embodiments of the present disclosure. In the solution, a group of candidate images is generated based on a target image by using a thermodynamic genetic algorithm (TDGA) model, the TDGA model being configured to apply one or more operations of a set of predetermined image processing operations during each evolution process; and multiple augmented images are determined from the group of candidate images based on free energy of the group of candidate images, the multiple augmented images being determined as belonging to the same classification with the target image.

In this way, according to embodiments of the present disclosure, data augmentation can be effectively implemented through crossover and mutation processes in a genetic algorithm.

The solution of the present disclosure will be described below with reference to the accompanying drawings.

Figure 1:
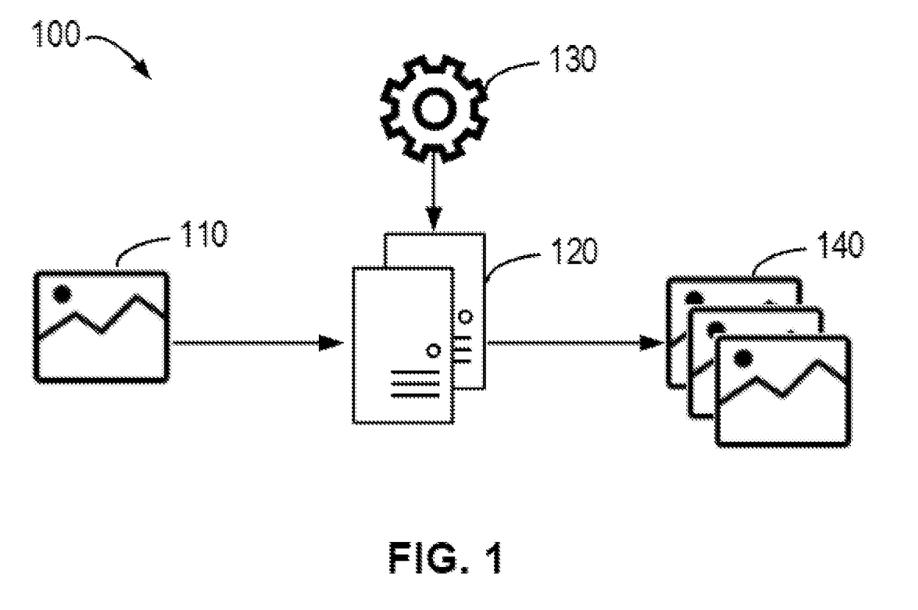
FIG. 1 illustrates a schematic diagram of an example environment in which embodiments of the present disclosure can be implemented.

FIG. 1 illustrates example environment 100 in which embodiments of the present disclosure can be implemented. As shown in FIG. 1, example environment 100 may include computing device 120. Computing device 120 may acquire target image 110 and utilize a thermodynamic genetic algorithm (TDGA) model 130 to generate multiple augmented images 140 based on target image 110.

A genetic algorithm, also referred to herein as a GA, is an optimization method based on a system evolution process. It has been used to solve discrete optimization problems because it does not require prior knowledge of rewards or differential gradients. However, the genetic algorithm is adversely affected by a phenomenon called premature convergence. In other words, population diversity tends to be lost during the early stage of search. Different from the traditional genetic algorithm, TDGA solves the problem of premature convergence by incorporating concepts of temperature and entropy into selection rules. Details on generating the multiple augmented images will be described in detail below.

Figure 2:
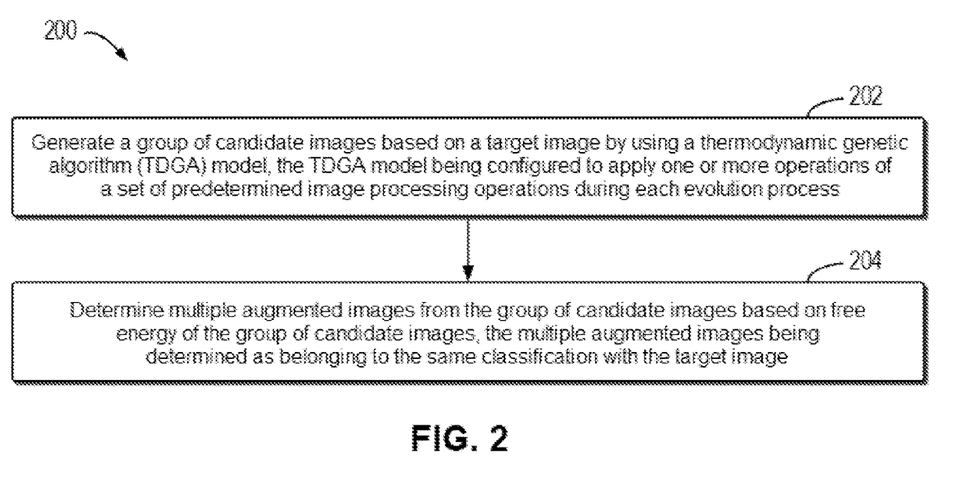
FIG. 2 illustrates a flow chart of an example method for data augmentation according to some embodiments of the present disclosure.

FIG. 2 illustrates a flow chart of process 200 of data augmentation according to some embodiments of the present disclosure. Process 200 may be implemented, for example, by computing device 120 shown in FIG. 1.

As shown in FIG. 2, at block 202, computing device 120 generates a group of candidate images based on target image 110 by using TDGA model 130, the TDGA model 130 being configured to apply one or more operations of a predetermined set of image processing operations during each evolution process.

In some embodiments, computing device 120 may acquire trained TDGA model 130 and utilize an evolution process in TDGA model 130 to generate a group of candidate images based on target image 110.

Specifically, in the evolution process of the TDGA model 130, similar to a simulated annealing algorithm, a temperature parameter is introduced to avoid the loss of population diversity. In the evolution process, TDGA can add a predetermined number of individuals with minimum free energy in each evolution to the next generation so as to achieve the goal of minimum free energy of the population.

In some embodiments, in the process of generating a group of candidate images by using TDGA model 130, one or more operations of a set of predetermined image processing operations may be implemented to individuals in each evolution process.

Exemplarily, the set of predetermined image processing operations may include, for example, sixteen image operations, such as automatic compression, equalization, reverse, rotation, positioning, exposure, increase of exposure rate, color, contrast, brightness, sharpness, shear X, shear Y, cutout, translation X, and translation Y.

In addition, for each image processing operation, it can be set with a magnitude M and a probability P of being selected. In some embodiments, the magnitude M may be a value between 0 and 30, for example. The probability P may be expressed as P=m/L, where m is a positive integer between 1 and 5, and L represents a chromosome length.

In this way, a search space automatically applied for by TDGA is about $31 \times 5 \times 10 \times 2^{16} \approx 1.0 \times 10^8$, which is much smaller than a size of search space of $10^{32}$ in an automatic augmentation algorithm.

At block 204, computing device 120 determines multiple augmented images 140 from a group of candidate images based on free energy of the group of candidate images, the multiple augmented images 140 being determined as belonging to the same classification with target image 110.

In some embodiments, the TDGA model may be trained based on a training data set D. In a training process, D may be divided into a training set and a validation set. Free energy of each candidate image may be determined, for example, based on the verification set. Specifically, accuracy of processing the validation set with the TDGA model trained on the training set may be regarded as a degree of fitting of individuals, and its negative value may be regarded as free energy of the individuals.

In some embodiments, computing device 120 selects a predetermined number of candidate images with the minimum free energy from a group of candidate images as multiple augmented images 140.

In this way, according to embodiments of the present disclosure, the augmented images can be efficiently constructed by making full use of various transformations in the genetic algorithm.

In some embodiments, the constructed augmented images may also be used for contrastive learning. Contrastive learning is intended to convert samples with the same classification into similar feature representations, and to convert samples with different classifications into different feature representations.

In some embodiments, since the augmented images generated based on TDGA always belong to the same classification with the target image, computing device 120 may further construct a training image set based on the target image and a group of candidate images, and train a contrastive learning model based on the training image set. The contrastive learning model is configured to minimize a distance between feature representations corresponding to image samples of the same type, and maximize a distance between feature representations corresponding to image samples of different types.

In this way, according to embodiments of the present disclosure, the quality of the contrastive learning model may be improved so that it can better distinguish between images of the same classification and images of different classifications.

In some embodiments, the trained contrastive learning model may also be used to process an image-based object layer detection task. Specifically, computing device 120 may receive a group of input images and utilize a contrastive learning model to determine a set of feature representations for the group of input images. Further, computing device 120 may also detect objects in the group of input images based on the set of feature representations.

In some embodiments, computing device 120 may rely on a dynamic saliency map, also referred to herein as a DSM, to detect objects in images. Specifically, computing device 120 may construct a dynamic saliency map based on the set of feature representations. Further, computing device 120 may determine objects in the group of input images based on the dynamic saliency map.

Figure 3:
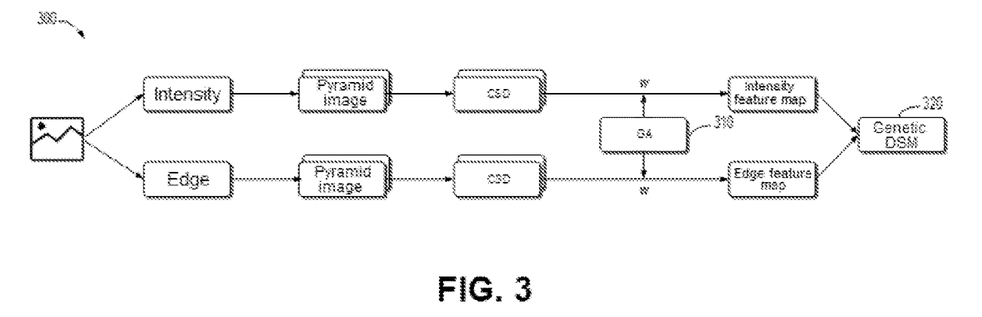
FIG. 3 illustrates a schematic diagram of generating a dynamic saliency map according to some embodiments of the present disclosure.

In some embodiments, computing device 120 may also utilize the genetic algorithm to optimize a generation process of the dynamic saliency map in an object detection process. The generation process of DSM will be described below with reference to FIG. 3. FIG. 3 illustrates schematic diagram 300 of generating DSM according to some embodiments of the present disclosure.

As shown in FIG. 3, different from the traditional generation process of DSM, computing device 120 may utilize GA model 310 to provide a weight for center-surround difference (CSD) maps. Specifically, computing device 120 may determine a group of CSD maps based on the set of feature representations, and determine a weight w for weighting the group of CSD maps based on genetic algorithm (GA) model 310.

For GA model 310, its fitness function may be determined as:

$$\text{fitness function} = E(1 - \text{overlap ratio}) \quad (1),$$

where an overlap ratio may be determined as:

$$\text{overlap ratio} = \frac{A_{T \cap D}}{A_{T \cup D}} = \frac{A_C}{A_T + A_D - A_C} \quad (2)$$

where $A_T$ represents a truth region to a target object, $A_D$ represents a region determined using DSM, and $A_C$ represents a region where the two overlap. GA model 310 is intended to minimize the fitness function as defined in equation (1).

In some embodiments, as shown in FIG. 3, computing device 120 may also construct a dynamic saliency map, also referred to as genetic DSM 320, based on the weighted group of CSD maps.

In some embodiments, traditional DSM analyzes dynamic characteristics of a saliency map using a maximum entropy between different consecutive frames within a given time period. However, entropy is calculated based on a histogram of pixel values corresponding to a local region. This entropy calculation process can involve a large amount of complex calculations, and therefore may not be suitable for embedded and real-time systems.

In some embodiments, in order to reduce the amount and complexity of calculations, computing device 120 may also determine the dynamic characteristics associated with the dynamic saliency map based on the variance of the pixel values of the local region, rather than relying on the traditional entropy calculation. Exemplarily, if the variance of pixels is greater than a predetermined threshold, then the pixels may be determined as foreground, for example.

In this way, according to embodiments of the present disclosure, calculation overhead may be further reduced, thereby increasing calculation efficiency.

Figure 4:
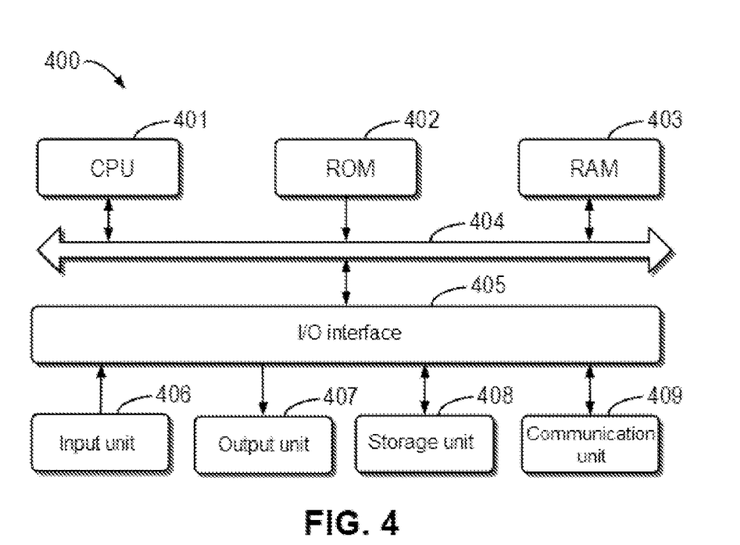
FIG. 4 illustrates a block diagram of an example device that may be configured to implement embodiments of the present disclosure.

FIG. 4 illustrates a schematic block diagram of example device 400 that may be configured to implement embodiments of the present disclosure. For example, computing device 120 according to embodiments of the present disclosure may be implemented by device 400. As shown in the figure, device 400 includes central processing unit (CPU) 401 that may execute various appropriate actions and processing according to computer program instructions stored in read-only memory (ROM) 402 or computer program instructions loaded from storage unit 408 to random access memory (RAM) 403. RAM 403 may further store various programs and data required by operations of device 400. CPU 401, ROM 402, and RAM 403 are connected to each other through bus 404. Input/output (I/O) interface 405 is also connected to bus 404.

A plurality of components in device 400 are connected to I/O interface 405, including: input unit 406, such as a keyboard and a mouse; output unit 407, such as various types of displays and speakers; storage unit 408, such as a magnetic disk and an optical disc; and communication unit 409, such as a network card, a modem, or a wireless communication transceiver. Communication unit 409 allows device 400 to exchange information/data with other devices through a computer network such as the Internet and/or various telecommunication networks.

Various processes and processing described above, for example, process 200, may be performed by CPU 401. For example, in some embodiments, process 200 may be implemented as a computer software program that is tangibly included in a machine-readable medium, for example, storage unit 408. In some embodiments, part of or all the computer program may be loaded and/or installed onto device 400 via ROM 402 and/or communication unit 409. When the computer program is loaded into RAM 403 and executed by CPU 401, one or more actions of process 200 described above may be implemented.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various implementations of the present disclosure have been described above. The foregoing description is illustrative rather than exhaustive, and is not limited to the disclosed implementations. Numerous modifications and alterations will be apparent to persons of ordinary skill in the art without departing from the scope and spirit of the illustrated implementations. The selection of terms used herein is intended to best explain the principles and practical applications of the implementations or the improvements to technologies on the market, so as to enable persons of ordinary skill in the art to understand the implementations disclosed herein.

What is claimed is:

1. A method for data augmentation, comprising:
    generating a group of candidate images based on a target image by using a first instance of a genetic algorithm, the first instance of the genetic algorithm being based on a thermodynamic genetic algorithm (TDGA) model, the TDGA model being configured to apply one or more operations of a set of predetermined image processing operations during each evolution process;
    determining multiple augmented images from the group of candidate images based on free energy of the group of candidate images, the multiple augmented images being determined as belonging to the same classification with the target image;
    utilizing a contrastive learning model to generate at least first and second feature representations of respective first and second different types based on the multiple augmented images;
    utilizing a second instance of a genetic algorithm to determine respective weightings for the first and second feature representations of respective first and second different types; and
    generating at least one saliency map based on the first and second feature representations and their respective weightings.

2. The method according to claim 1, further comprising:
    constructing a training image set based on the target image and the group of candidate images; and
    training the contrastive learning model based on the training image set, wherein the contrastive learning model is configured to minimize a distance between feature representations corresponding to image samples of the same type, and maximize a distance between feature representations corresponding to image samples of different types.

3. The method according to claim 2, further comprising:
receiving a group of input images;
determining a set of feature representations for the group of input images by using the contrastive learning model; and
detecting objects in the group of input images based on the set of feature representations.

4. The method according to claim 3, wherein detecting objects in the group of input images based on the set of feature representations comprises:
constructing a dynamic saliency map based on the set of feature representations; and
determining objects in the group of input images based on the dynamic saliency map.

5. The method according to claim 4, wherein constructing a dynamic saliency map based on the set of feature representations comprises:
determining a group of center-surround difference (CSD) maps based on the set of feature representations;
determining a weight for weighting the group of CSD maps based on the TDGA model; and
constructing the dynamic saliency map based on the weighted group of CSD maps.

6. The method according to claim 4, wherein one or more dynamic characteristics associated with the dynamic saliency map are determined based on a variance of pixel values of a local region.

7. An electronic device, comprising:
at least one processing unit;
at least one memory coupled to the at least one processing unit and storing instructions for execution by the at least one processing unit, wherein the instructions, when executed by the at least one processing unit, cause the electronic device to perform actions comprising:
generating a group of candidate images based on a target image by using a first instance of a genetic algorithm, the first instance of the genetic algorithm being based on a thermodynamic genetic algorithm (TDGA) model, the TDGA model being configured to apply one or more operations of a set of predetermined image processing operations during each evolution process;
determining multiple augmented images from the group of candidate images based on free energy of the group of candidate images, the multiple augmented images being determined as belonging to the same classification with the target image;
utilizing a contrastive learning model to generate at least first and second feature representations of respective first and second different types based on the multiple augmented images;
utilizing a second instance of a genetic algorithm to determine respective weightings for the first and second feature representations of respective first and second different types; and
generating at least one saliency map based on the first and second feature representations and their respective weightings.

8. The electronic device according to claim 7, wherein the actions further comprise:
constructing a training image set based on the target image and the group of candidate images; and
training the contrastive learning model based on the training image set, wherein the contrastive learning model is configured to minimize a distance between feature representations corresponding to image samples of the same type, and maximize a distance between feature representations corresponding to image samples of different types.

9. The electronic device according to claim 8, wherein the actions further comprise:
receiving a group of input images;
determining a set of feature representations for the group of input images by using the contrastive learning model; and
detecting objects in the group of input images based on the set of feature representations.

10. The electronic device according to claim 9, wherein detecting objects in the group of input images based on the set of feature representations comprises:
constructing a dynamic saliency map based on the set of feature representations; and
determining objects in the group of input images based on the dynamic saliency map.

11. The electronic device according to claim 10, wherein constructing a dynamic saliency map based on the set of feature representations comprises:
determining a group of center-surround difference (CSD) maps based on the set of feature representations;
determining a weight for weighting the group of CSD maps based on the TDGA model; and
constructing the dynamic saliency map based on the weighted group of CSD maps.

12. The electronic device according to claim 10, wherein one or more dynamic characteristics associated with the dynamic saliency map are determined based on a variance of pixel values of a local region.

13. A computer program product, stored in a non-transitory computer storage medium and comprising machine-executable instructions, wherein when run in a device, the machine-executable instructions cause the device to perform actions comprising:
generating a group of candidate images based on a target image by using a first instance of a genetic algorithm, the first instance of the genetic algorithm being based on a thermodynamic genetic algorithm (TDGA) model, the TDGA model being configured to apply one or more operations of a set of predetermined image processing operations during each evolution process;
determining multiple augmented images from the group of candidate images based on free energy of the group of candidate images, the multiple augmented images being determined as belonging to the same classification with the target image;
utilizing a contrastive learning model to generate at least first and second feature representations of respective first and second different types based on the multiple augmented images;
utilizing a second instance of a genetic algorithm to determine respective weightings for the first and second feature representations of respective first and second different types; and
generating at least one saliency map based on the first and second feature representations and their respective weightings.

14. The computer program product according to claim 13, wherein the actions further comprise:
constructing a training image set based on the target image and the group of candidate images; and
training the contrastive learning model based on the training image set, wherein the contrastive learning model is configured to minimize a distance between feature representations corresponding to image samples of the same type, and maximize a distance between feature representations corresponding to image samples of different types.

15. The computer program product according to claim 14, wherein the actions further comprise:
receiving a group of input images;
determining a set of feature representations for the group of input images by using the contrastive learning model; and
detecting objects in the group of input images based on the set of feature representations.

16. The computer program product according to claim 15, wherein detecting objects in the group of input images based on the set of feature representations comprises:
constructing a dynamic saliency map based on the set of feature representations; and
determining objects in the group of input images based on the dynamic saliency map.

17. The computer program product according to claim 16, wherein constructing a dynamic saliency map based on the set of feature representations comprises:
determining a group of center-surround difference (CSD) maps based on the set of feature representations;
determining a weight for weighting the group of CSD maps based on the TDGA model; and
constructing the dynamic saliency map based on the weighted group of CSD maps.

18. The computer program product according to claim 16, wherein one or more dynamic characteristics associated with the dynamic saliency map are determined based on a variance of pixel values of a local region.

* * * * *